United States Patent
Hough

[11] 3,752,206
[45] Aug. 14, 1973

[54] VENTED VEHICLE TIRE
[76] Inventor: Dean R. Hough, 3901 Nantasket St., Pittsburgh, Pa. 15207
[22] Filed: Jan. 18, 1972
[21] Appl. No.: 218,757

[52] U.S. Cl.................. 152/330, 152/355, 152/358
[51] Int. Cl. .......................... B60c 9/14, B60c 19/00
[58] Field of Search..................... 152/153, 330, 355, 152/358, 361, 367, 371

[56] References Cited
UNITED STATES PATENTS

| | | | |
|---|---|---|---|
| 3,024,827 | 3/1962 | Hough | 152/330 |
| 3,160,194 | 12/1964 | Barrett | 152/367 |
| 1,497,131 | 6/1924 | Crosley, Jr. | 152/367 |

FOREIGN PATENTS OR APPLICATIONS

| 985 | 1913 | Great Britain | 152/371 |
|---|---|---|---|

Primary Examiner—Gerald M. Forlenza
Assistant Examiner—Robert Saifer
Attorney—William J. Ruano

[57] ABSTRACT

A vehicle tire construction and method for retreaded (or new) tires involving the use of a single patch, or two patches of cord of large mesh extending laterally of the tire casing between the buffed surface and tread rubber. The patch has stretchable or elastic cords, an intermediate portion thereof being connected to the cord ply layer of the casing and the ends projecting about half way or more of the sidewalls, and possibly as far as the beads, to vent air pockets which tend to accumulate. The patch makes use of the porous nature of the buffed surface.

7 Claims, 5 Drawing Figures

Patented Aug. 14, 1973 3,752,206

VENTED VEHICLE TIRE

This invention relates to a vehicle tire construction and method of making the same and is an improvement over my U.S. Pat. Nos. 3,024,827, dated Mar. 13, 1962 and No. 3,563,295, dated Feb. 16, 1971.

An outstanding disadvantage of the venting cord net contstruction and arrangement shown in the aforesaid patents is that the cord net covers the casing, that is, it extends along the entire perimeter. This creates problems by requiring different widths of the cord net for different size tires such as passenger and truck tires, involving the necessity of an expensive inventory of cord nets of various widths.

A further disadvantage is that such cord net constructions extend only a short distance beyond the tire tread, therefore, during the curing process, particularly when using molds having long skirt matrices that fully cover three fourths of the side walls while the tire is being cured, air pockets will be trapped in the side walls or under the tread since the escape path is sealed by the molds. This fault is aggravatated by the present trend in this country to convert molding equipment to bead-to-bead retreading involving applying new rubber not only to the tread surface but to the sidewall area.

A still further disadvantage of the net cord arrangement described in my aforesaid patents is that considerable difficulty is involved in wrapping the net cord layer around the entire circumference of the carcass so as to cover it, particularly in anchoring the cut-ends of the cord net emerging from the sidewalls after being cut to the proper length to match the circumference of the tire. Staples have been used in the past for this purpose but these have the disadvantage of puncturing the sidewalls of the tire which often results in a fault which could develop into a blowout.

Added to this disadvantage, covering of the casing by the cord layers adds considerably to the cost to retreaders who work on a very low profit margin. In many cases, the requirement of covering the tread makes retreading prohibitive, or at least less attractive than buying new tires.

A still further disadvantage is that the cord construction is not stretchable sufficiently to overcome the fault of cutting into the buffed surface of the carcass as a consequence of the growth of the casing while being cured in the tire mold with pressures of 135 to 200 pounds per square inch, also as a consequence of flexing which results from rotation of the tires while riding the vehicle. In many instances, failure to stretch has caused cord breaks. This radially inwardly cutting up to the cord plies has also resulted in air pockets that eventually caused a blow out.

After very considerable research on this problem, I made the remarkable and unexpected discovery that the theory of air ventilation of the tire body, dictating the construction of the cord net described in my prior patents, is not entirely correct, — particularly in the assumption that the cord net must cover the casing, — that is to say, that it must be entrained about the entire perimeter of the casing. This was based on the incorrect assumption in the aforesaid patents that air pressure built up within the cord body must be tapped at a plurality of locations about the entire periphery of the casing to prevent developing air pockets that might lead to tread separation on use of the tire. I found that this theory is wrong and, contrary to such present beliefs in the art, I have made the unexpected discovery that only a single outlet is sufficient to allow excessive pressure built-up within the cord body to escape. This is because of the unexpected discovery that I have made that a tire progressively starts to breathe as it wears out, — that is, it breathes through the worn tread surface from small cuts and snags in the worn rubber. In many instances the whole tire will bleed all the trapped air from a single very small puncture in the surface rubber.

Therefore, I came to the conclusion that it was not necessary to cover the casing with a net work of cord and that, instead, it was sufficient to provide only a patch, transversely of the tire, for effectively bleeding air pockets developed anywhere about the entire perimeter with the aid of the inherent venting characteristic of the cord plies. This appears unbelievable but is absolutely true, — that is to say, a patch of cord net extending laterally of the tire (instead of circumferentially) can bleed a pocket 180° away without the necessity of any intermediate cord vents as deemed necessary in said prior patents.

Not only is a single patch less expensive because of the very short length necessary, — but actually it is more effective in relieving air pockets, particularly in molds having long skirt matrices which cover three fourths or more of the side walls or in bead-to-bead retreading equipment.

An object of the present invention is to provide a novel tire construction and net cord construction for either retreaded or new tires that will provide an escape path or vent for air pockets that may develop between the casing and tread rubber, either as the result of the recapping process or as the result of usage of the tire.

A more specific object is to provide a venting cord net in the form of a laterally extending patch which is capable of venting air pockets along the entire periphery of the tire.

Other objects and advantages will become more apparent from a study of the following description taken with the accompanying drawing wherein.

Figure 1:
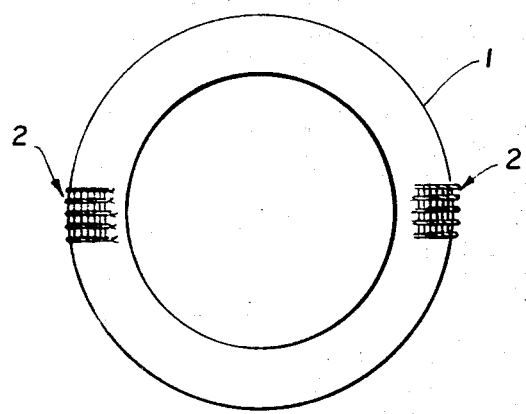
FIG. 1 is a side view of a buffed tire carcass showing a pair of cord net patches, embodying the present invention, on diametrically opposite sides of the carcass.
Figure 2:
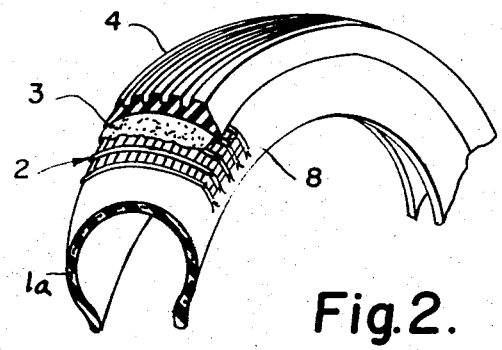
FIG. 2 is a top, perspective, fragmentary view of a vehicle tire in which the tread layer is shown partly cut-away from the casing or carcass to better illustrate the intermediate cord net patch embodying the principles of the present invention.

Referring more particularly to FIGS. 1 and 2 of the drawing, numeral 1 denotes a buffed tire carcass, which carcass has the usual cord ply layer or layers 1a extending along the entire periphery. In accordance with the teachings of the present invention, either a single tire patch 2, or preferably two of such patches on diametrically opposite sides, as shown in FIG. 1, are provided. It is desirable, although not absolutely necessary, that direct contact be made between a portion of the patch 2 and the topmost ply layer 1a, which can be effected by jamming a short piece of patch 2 radially through the covering rubber of the carcass until it contacts one of the ply layers 1a. In instances where a worn tire has a worn surface which exposes a part of the top ply layer 1a, the spot is scived and the patch will make direct contact with ply layer 1a. In some instances the patch need only extend from a scived area to one of the tire beads or close to it rather than to extend toward both tire beads.

As shown in FIG. 1, the patch 2 extends at least half way of the length of the sidewalls. In other applications, it may extend more than such distance, perhaps three-fourths of the sidewalls or even the entire distance to the beads. The latter arrangement is especially useful for bead-to-bead molding equipment.

The ends of the patches 2 are anchored to the sidewalls by pressure sensitive tape, according to my invention, and it is important that the length of the patches be sufficient so that during the molding process, the ends of the patches will extend beyond the molding shoes of the retreading molds. This will insure that air pockets will not develop in the cord body of the tire as they might otherwise do if the ends of the patches were covered by the molding equipment so as to prevent venting.

After one or more patches 2 are applied laterally of the carcass, a very thin layer of cushion gum 3 is applied thereon to form a bond between the carcass and the retread layer 4. At this point, it should be noted that this construction is also applicable to new tires, that is where the carcass 1 is brand new rather than buffed after wear. It might be desirable in some instances to apply a slightly porous layer of new rubber between the outermost ply layer 1a and patch 2. Whether tread 4 is a retread of an old tire or a new tread of a new tire, the molding of the intermediate patch 2 is essentially the same as well in the requirement that the ends of the patch extend beyond the mold equipment.

Figure 3:
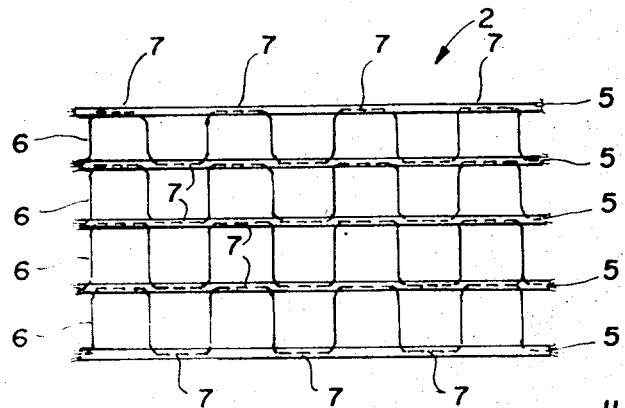
FIG. 3 is an enlarged, plan view of one of the cord net patches shown in FIG. 1 and of that shown in FIG. 2.

FIG. 3 shows, in somewhat schematic form, the construction of one of the tire patches 2, comprising a cord 6, preferably of cotton since it provides better venting of air, being fibrous, which cord 6 is knitted in sinuous form along a plurality of spaced parallel rows.

Figures 4, 5:
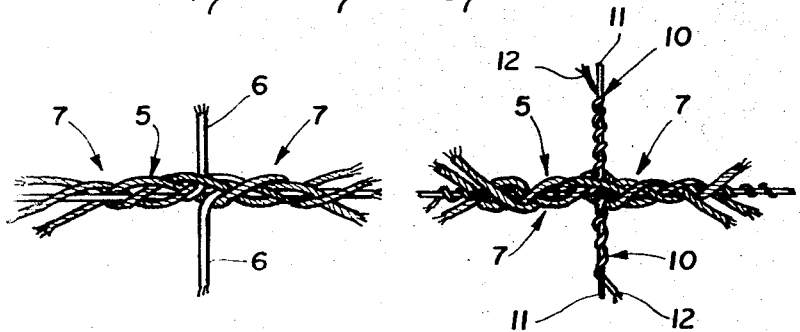
FIG. 4 is a further enlarged, fragmentary view of a portion of the cord net patch shown in FIG. 3; and, FIG. 5 is a further enlarged, fragmentary view of a modified cord net patch construction as compared to that shown in FIG. 4.

FIG. 4 shows the detailed knitted construction which reveals that cotton cord 6 is made up of a plurality of strands and is bent at right angles at its juncture with the knitted cord 7 which extends longitudinally of the patch. This right angular bend of cord 6 is very effective in permitting stretching of cord portion 7 or, more accurately, in permitting shortening of the cord portion 6 in the gap between cords 7, since tensioning of cord 7, as a consequence of molding, will cause a laterally extending portion of the cord 6 to be added to the cord 7 length and taken away from the cord 6 length. Stated differently, cord 7, which is essentially braided with a central core formed from a portion of cord 6 will permit increasingly shorter portions of the length of cord 6 to extend at right angles to cord 7 so as to decrease the length of the portion 6 bridging the gap between the parallel portions 7 and thereby compensate for any abnormal tension in cord 7 due to the molding process or as the result of use of the tire.

FIG. 5 shows a modification of the construction shown in FIG. 4 wherein portion 6 is replaced by an elastic core 11 about which is wound a non-elastic cotton or other fibrous cord 12, either single-filar, bi-filar or multi-filar. Such core 11 of rubber or other elastic material is to insure stretchability of the portion 10 of the net bridging the gap between cords 7. In some instances, especially in case of very high twists of cords 12, the core 11 may be also of cotton or perhaps of nylon or other strong plastic material, in which case it would be far better to have cords 10 of cotton so as to provide a better air vent than would be provided by a plastic fiber such as nylon which is solid rather than fibrous, therefore will not effectively vent air. In short, it is advantageous to provide multi-filar portions throughout the entire net so as to insure a proper air vent path, as compared to a single strand 11 especially of plastic material that is very inefficient in providing air venting.

Thus it will be seen that I have provided a relatively simple patch construction of cord net which is far less expensive than previous net cord constructions used for venting trapped air pockets as described in my aforesaid patents and which is far more effective in venting air pockets, particularly when recapping with long skirt matrices or bead-to-bead recapping equipment, and which is considerably easier to apply by the retreader.

While I have illustrated and described several embodiments of my invention, it will be understood that these are by way of illustration only and that various changes and modifications may be contemplated within the scope of the following claims.

I claim:

1. A vehicle tire comprising a casing having at least one ply cord layer, a patch in the form of a network of cord of large mesh extending laterally of the tire casing between a buffed surface of the casing and a tread layer, the ends of said patch extending about a substantial portion of the sidewalls of said casing beyond said tire tread, said patch covering only a very small portion of the tire casing, substantially the entire remainder of the casing being uncovered, and means for providing air communicating paths between said ply layer and said patch including said buffed surface which is porous for providing multiple escape paths to vent air trapped in pockets formed between said casing and said tread rubber.

2. A vehicle tire as recited in claim 1 wherein said means includes a direct contact between a portion of said patch and said ply layer.

3. A vehicle tire as recited in claim 1 together with a second patch of the same construction as said first mentioned patch extending about 180° therefrom and between said buffed casing and tread layer.

4. A vehicle tire as recited in claim 1 wherein the cord portions of said patch network extending laterally of said casing are elastic material.

5. A vehicle tire as recited in claim 4 wherein said laterally extending cord portions are of rubber.

6. A vehicle tire as recited in claim 4 wherein said laterally extending cord portions are of multi-filar, highly twisted cotton.

7. A vehicle tire as recited in claim 4 wherein said laterally extending cord portions comprise an elastic core having twisted cotton wrapped therearound.

* * * * *